United States Patent
Klausing et al.

(10) Patent No.: US 6,965,342 B2
(45) Date of Patent: Nov. 15, 2005

(54) METHOD FOR RECOGNIZING AND IDENTIFYING OBJECTS

(75) Inventors: Helmut Klausing, Wessling-Hochstadt (DE); Horst Kaltschmidt, Neubiberg (DE)

(73) Assignee: EADS Deutschland GmbH, Ottobrunn (DE)

( * ) Notice: Subject to any disclaimer, the term of this patent is extended or adjusted under 35 U.S.C. 154(b) by 34 days.

(21) Appl. No.: 10/475,597
(22) PCT Filed: Apr. 25, 2002
(86) PCT No.: PCT/DE02/01520
§ 371 (c)(1), (2), (4) Date: Oct. 23, 2003
(87) PCT Pub. No.: WO02/088770
PCT Pub. Date: Nov. 7, 2002

(65) Prior Publication Data
US 2004/0145511 A1 Jul. 29, 2004

(30) Foreign Application Priority Data
Apr. 26, 2001 (DE) .......................... 101 20 537

(51) Int. Cl.[7] .............................................. G01S 13/00
(52) U.S. Cl. .......................... 342/52; 342/25 R; 342/65
(58) Field of Search ............................. 342/25 R, 26 B, 342/52–54, 59, 63, 65, 90

(56) References Cited

U.S. PATENT DOCUMENTS

| | | | |
|---|---|---|---|
| 5,808,916 A | 9/1998 | Orr et al. | |
| 5,963,653 A | 10/1999 | McNary et al. | |
| 5,995,681 A | 11/1999 | Lee et al. | |
| 6,054,947 A | * 4/2000 | Kosowsky | 342/191 |
| 6,219,594 B1 | 4/2001 | Nicosia et al. | |
| 6,577,264 B1 | * 6/2003 | Wolframm | 342/25 R |
| 6,795,590 B1 | * 9/2004 | Chen | 382/294 |

FOREIGN PATENT DOCUMENTS

| | | |
|---|---|---|
| DE | 3922086 | 10/1990 |
| DE | 4007612 | 5/1991 |
| DE | 4323511 | 1/1995 |
| DE | 4328573 | 3/1995 |
| DE | 19902007 | 8/2000 |
| DE | 19902008 | 8/2000 |
| DE | 10015164 | 10/2001 |
| EP | 0915349 | 5/1999 |

OTHER PUBLICATIONS

Klausing et al., "Feasibility of a Synthetic Aperture Radar with Rotating Antennas (Rosar)", iEEE international radar conference, May 7–10, 1990, pp.: 51–56.*

High Resolution Imaging of Objects at KaBand by: Z.F. Fan, X.J. Zu, S. Zhao and J.H. Mao, Oct., 1995 in vol. 31, No.: 4 of IEEE Transactions on Aerospace and Electronic Systems —copy annexed.

Nonuniformly Spaced Array Imaging by Hsueh–Jyh Li, Mar., 1993 in vol. 41, No. 3 of IEEE Transactions on Antennas and Propagation—copy annexed.

(Continued)

*Primary Examiner*—Thomas H. Tarcza
*Assistant Examiner*—Isam Alsomiri
(74) *Attorney, Agent, or Firm*—Collard & Roe, P.C.

(57) ABSTRACT

A method for recognizing and identifying objects by means of several sensors, particularly using imaging sensors (L, W, V) in the infrared and/or visible wavelength range and radar devices (R) which are based on the generation of a synthetic aperture. According to the invention, generation of the synthetic aperture occurs in accordance with the ROSAR principle, wherein a plurality of antenna elements (A), which the radar device (R) comprises, is placed on the aircraft (F) along its arched contour (K), controlled sequentially and scanned, and wherein the information acquired by the radar devices (R) and the imaging sensors (L, W, V) is subsequently processed, in such a way that optimal imaging of the surroundings of the aircraft (F) is made possible in every viewing direction.

8 Claims, 2 Drawing Sheets

OTHER PUBLICATIONS

*Registration of SAR and FLIR Images for ATR Application* by Yang Chen, in Proceedings of SPIE vol. 4380 (2001), —Search Report.

*Fusion of Imaging and Non–Imaging Data for Surveillance Aircraft* by Elisa Shahbazian, et al. in Proceedings of SPIE vol. 3087 –Search Report.

* cited by examiner

METHOD FOR RECOGNIZING AND IDENTIFYING OBJECTS

CROSS REFERENCE TO RELATED APPLICATIONS

Applicants claim priority under 35 U.S.C. §119 of German Application No. 10120537.6 filed on Apr. 26, 2001. Applicants also claim priority under 35 U.S.C. §365 of PCT/DE02/01520 filed on Apr. 25, 2002. The international application under PCT article 21(2) was not published in English.

The invention relates to a method for recognizing and identifying objects, in accordance with the preamble of claim 1.

BACKGROUND AND SUMMARY OF THE INVENTION

U.S. Pat. No. 5,963,653 describes a method for recognizing and identifying objects, whereby data from several sensors are processed and evaluated together. In particular, SAR (synthetic aperture radar) and IR (infrared) sensors are used in this connection. However, it has proven to be a disadvantage that imaging is possible only crosswise to the flight direction, using the SAR radar devices. Common evaluation of data from the SAR radar devices with IR sensors is therefore possible only for a limited sight range.

It is therefore the task of the invention to indicate a method with which it is possible to recognize and identify objects, using SAR radar equipment and IR sensors also in the flight direction.

This task is accomplished using the method according to claim 1. Advantageous embodiments of the method according to the invention are the object of dependent claims.

According to the invention, generation of the synthetic aperture occurs in accordance with the ROSAR principle, wherein a plurality of antenna elements, which the radar device comprises, is placed on the aircraft along its arched contour, controlled sequentially and scanned. The information acquired by the radar devices and the imaging sensors is subsequently processed, according to the invention, in such a way that optimal imaging of the surroundings of the aircraft is made possible in every viewing direction.

Using the antenna elements of the radar device that function according to the ROSAR principle, arranged according to the invention, it is therefore possible to image not only the region crosswise to the flight direction of the aircraft, but also the region in the flight direction of the aircraft. In contrast to known SAR radar devices, the sight range of the ROSAR radar device used in the method according to the invention is not limited to a specific viewing angle.

The synthetic aperture known for the conventional SAR method is not generated, in the proposed radar system, in that the aircraft moves relative to the target object, for example, but rather the individual antenna elements, arranged adjacent to one another, are electronically controlled sequentially and scanned. In the evaluation according to the ROSAR method, as well, the rotating antenna movement is simulated by means of the sequential control and scanning of adjacent antenna elements.

Using the method according to the invention, the orientation and navigation of an aircraft is significantly improved by means of an active warning of obstacles and imaging of the existing earth surface. However, the orientation, particularly in the case of an aircraft at take-off and landing, for example in the case of technically inadequate airports, is also significantly improved.

For this purpose, imaging and perception of the flight pass and landing field, as well as timely recognition of obstacles, a precise navigation possibility, and an efficient transmission of voice/data by way of communications networks are required.

A safe landing of aircraft on technically inadequate airfields, or those not equipped at all, requires all-weather-capable, aircraft-autonomous flight control to the landing strip, as it is possible using a radar device that functions according to the ROSAR principle (ROSAR sensor), and the additional capability of also recognizing smaller parts, for example on the landing strip, that are hazardous for the take-off and landing procedure.

The measures described below provide comprehensive coverage of the landing concept for aircrafts, for example air planes, drones, or helicopters having different sensor systems, even taking into consideration military aspects, which coverage includes intelligent signal processing and communication.

It is advantageous if the data acquired by the sensors, where it is advantageous if these are laser radar devices, heat imaging devices, or video cameras integrated into the aircraft nose, and the data acquired using the ROSAR sensor, are collected by a first data processing unit and processed to produce a common image. Because of the multi-spectral effect of a combination of a ROSAR sensor with an optronic sensor, object signatures can be evaluated and imaged in better and more precise manner. If a laser radar device is used as an option sensor, for example, a more detailed image of the surroundings will be achieved for the common image, because of the improved distance resolution and lateral resolution.

Using the method according to the invention, a quasi-three-dimensional radar image of the terrain and the obstacles will be produced, using the ROSAR sensor. The precise resolution takes place using the option sensor, where it is advantageous if these are laser radar devices, heat image devices, or video cameras. By means of the coupling of the radar device that functions according to the ROSAR principle (ROSAR sensor), usually in the cm or mm wavelength range, with the option sensors, which usually function in the infrared or visible range, the all-weather capabilities of the ROSAR sensor supplement the high resolution capabilities of the option sensors in the near range. Thus, for example, in the case of an aircraft landing, the limited usability of the option sensors in bad weather is of subordinate importance, since here only short ranges are required for the recognition of obstacles.

Another advantage is that using a combination of different active and passive option sensors with the ROSAR sensor, a graduated poor-weather capability is achieved. Thus, the method according to the invention guarantees that even upon entry into the poor-weather range, imaging of the surroundings is possible.

The range of option sensors in poor weather is greater for the passive infrared sensor (in the atmospheric windows 8–12 $\mu$m and 3–5 $\mu$m) because of the greater wavelength and the illumination-dependent thermal emission of objects to be imaged (fire sight) than that of laser radar (in the wavelength range of approximately 1.5 $\mu$m), followed by a video camera.

Using the method according to the invention, data with different dimensionalities can be linked with one another. A radar device functioning according to the ROSAR principle, or a laser radar device generates a spatial top view of the terrain to be imaged. The option sensors, such as heat image cameras or video cameras, offer a perspective view of the terrain to be imaged. Using the method according to the invention, these data are linked with one another and can be made visible or processed further. Thus, for example, flat parts located on a landing strip can also be represented as flat parts in a cartographic image of the landing strip.

An advantage of linking a ROSAR sensor with option sensors is that in addition to a determination of the object position that is independent of the weather, a determination of the object properties that is independent of the weather is also possible. Thus, it is possible, using a ROSAR sensor, to obtain information about the material of an object to be imaged, for example, even in poor weather.

In an advantageous embodiment of the method according to the invention, the image generated in the first data processing unit is processed further in a second data processing unit, with a corresponding terrain image from a database, to produce a further image. This further processing of the data with the corresponding terrain image takes place by means of the known pass-point method and additionally by means of a pass-area method. Pass areas are terrain regions that are characterized by noticeable line arrangements or textures and that are indicated on the map. The image correction required for data linking is then carried out analogous to the known pass-point method and pass-areas.

Linking of the image generated in the first data processing unit with the terrain image takes place by means of symbolic and/or by means of iconic image processing. In the case of iconic image processing, the pass-points symbolically arranged on the map are transformed into pass-areas as a two-dimensional image signal, as they are typical, in particular, for road intersections and texture peculiarities, and it is advantageous if they are then linked with the image data from the first data processing unit. It is advantageous if these data, acquired within the framework of data diffusion, e.g. obstacle data, are either displayed on a display or represented in a known virtual cockpit.

Navigation takes place, in particular, on the basis of a digitalized terrain map, including added infrastructure data (airport, landing strip, taxiways, etc.) in the form of a CD-ROM as the database. In the case of a virtual cockpit, flight control therefore takes place using the combination of a digital terrain model together with a satellite-supported navigation system, where it is advantageous if this is GPS (global positioning system). The region over which the aircraft has just flown is shown from the viewing position of the pilot, in the form of a synthetic view, in real time. Because of its better positioning accuracy, the more suitable differential GPS is proposed.

It is advantageous if the acquired data are transmitted to an evaluation station or to other communications participants, for example other aircraft. This can be done, for example, by way of the mobile radio network (GSM network) and/or by means of mobile communications via satellites. The use of mobile communications allows two-way communication, i.e. full duplex operation and group communication. As an alternative, transmissions by means of high-frequency technology (HF/VHF network) are also possible, but then the required large antenna must be integrated into the fuselage of the aircraft.

However, in exchange HF/VHF transmission has the advantage that it is independent of the available infrastructure.

Transmission takes place, entirely or in part, in automated manner, and also serves to establish a formation or fleet management. Furthermore, automatic, semi-automatic, or even manually controlled communication with databases (for example a database of the airport) takes place, in order to call up data that are relevant for flight safety, on the one hand, and to transmit current data from the surroundings of the aircraft during landing (obstacles, weather condition data, etc.) to external databases, on the other hand. This is particularly necessary and useful in military operations in unknown airfield terrain.

BRIEF DESCRIPTION OF THE DRAWINGS

The invention will be explained in greater detail, using the figures. These show.

DETAILED DESCRIPTION OF THE DRAWINGS

Figure 1:
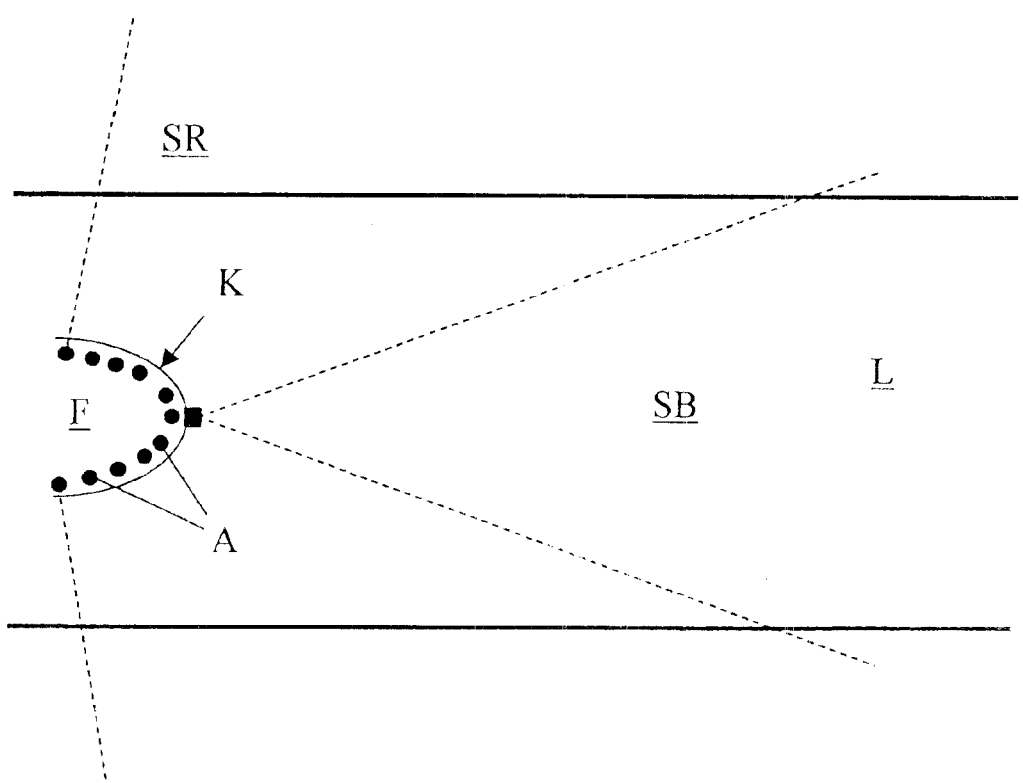
FIG. 1 a schematic top view of an airfield as well as an aircraft with sensors arranged as examples.

FIG. 1 shows a schematic top view of an airfield L as well as an aircraft F. The antenna elements A of the ROSAR sensor are arranged along the contour K of the aircraft F, as examples. Furthermore, an imaging sensor S, e.g. a laser radar device, heat imaging device, or a video camera, is also affixed to the nose of the aircraft F. Using this sensor S, a maximum sight range SB is imaged in the flight direction. Using the antenna elements A of the ROSAR sensor, it is possible to image a much larger sight range. The sight range SR shown in FIG. 1 only serves as an example. If the antenna elements A are suitably arranged along the contour K of the aircraft F, an all-around view is also possible.

The limits of the sight ranges SR, SB are shown with broken lines, in each instance.

Figure 2:
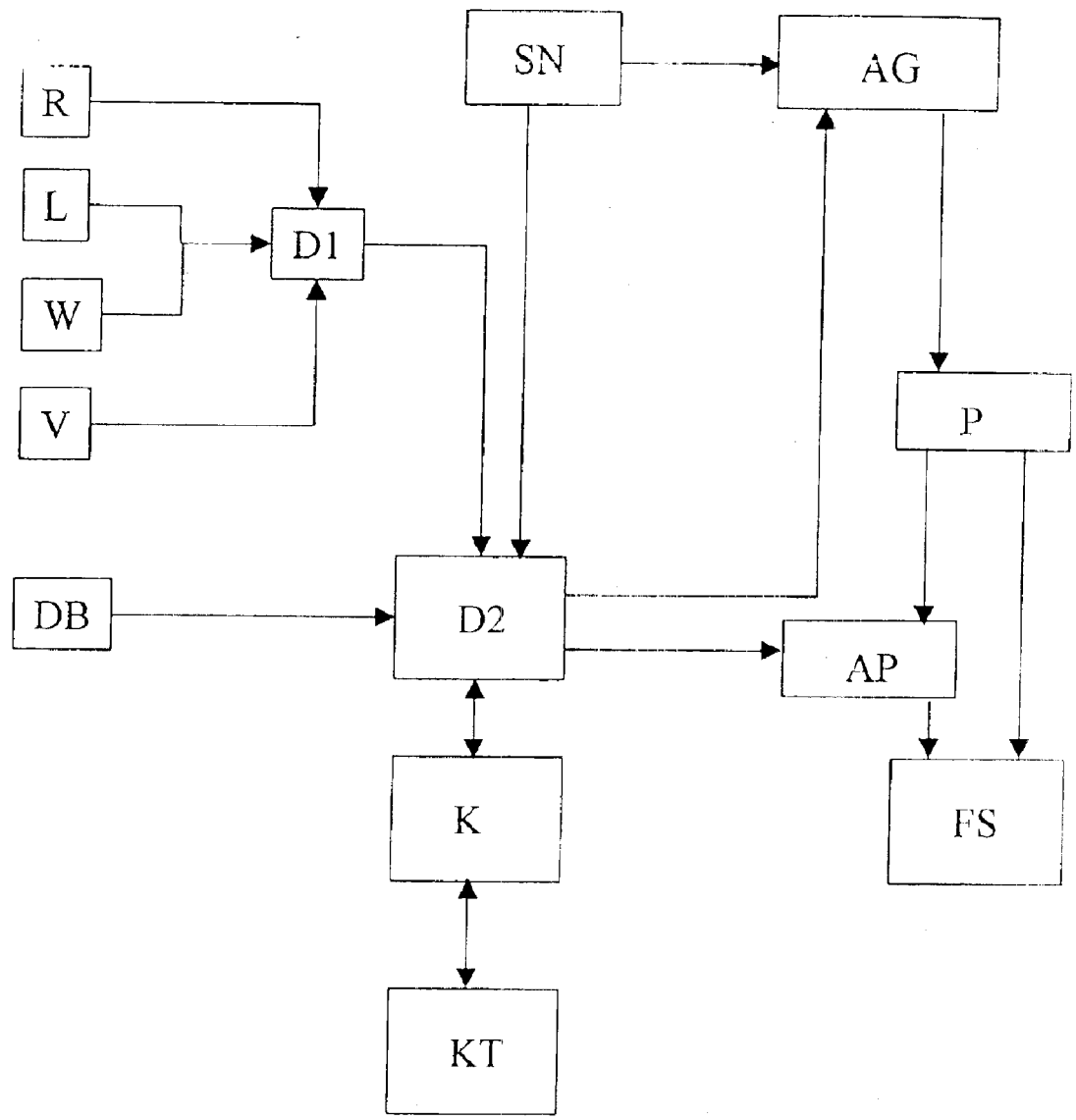
FIG. 2 the method according to the invention as an exemplary representation, in a block schematic.

The method according to the invention is shown in a block schematic in FIG. 2, as an example. The data of the individual sensors, for example the ROSAR sensor R, laser sensor L, heat imaging device W, and video camera V, are brought together in the first data processing unit D1. The data of the first data processing unit D1 are passed to a second data processing unit D2. Data from a satellite navigation system SN are passed to this second data processing unit D2. In addition, a digital terrain image is passed to the data processing unit D2 from a database DB. Furthermore, data can be exchanged between the data processing unit D2 and a communications system K, which is a GSM network, a satellite communications network, or an HF/VHF network, for example. Furthermore, additional communications participants KT, such as airports or other aircraft, are connected with the communications network K. Therefore it is also possible that data from the data processing unit D2 can be transmitted to the other communications participants KT or that data from other communications participants KT can be transmitted to the data processing unit D2.

The data generated in the data processing unit D2 are passed to an autopilot AP and to a display device AG, e.g. a display or a virtual cockpit.

In addition, data from the satellite navigation system SN are passed to the display device AG and made visible to a pilot P. The pilot P can feed these data to an autopilot AP. The entire aircraft control is performed either by the pilot P or by the autopilot AP.

What is claimed is:

1. Method for recognizing and identifying objects by means of several sensors, particularly using imaging sensors (L, W, V) in the infrared and/or visible wavelength range and radar devices (R) which are based on the generation of a synthetic aperture, characterized in that generation of the synthetic aperture occurs in accordance with the ROSAR principle, wherein a plurality of antenna elements (A), which the radar device (R) comprises, is placed on the aircraft (F) along its arched contour (K), controlled sequentially and scanned, and wherein the information acquired by the radar devices (R) and the imaging sensors (L, W, V) is subsequently processed, in such a way that optimal imaging of the surroundings of the aircraft (F) is made possible in every viewing direction.

2. Method according to claim 1, characterized in that the imaging sensors (L, W, V) are integrated into the nose of the aircraft and are, in particular, lasar radar devices, heat imaging devices, or video cameras.

3. Method according to claim 1, characterized in that the data acquired by the individual radar devices (R) and/or sensors (L, W, V) are collected by a first data processing unit (D1) and processed to produce a common image.

4. Method according to claim 3, characterized in that the image generated in the first data processing unit (D1) is processed further in a second data processing unit (D2), with a corresponding terrain image from a database (DB), to produce a further image.

5. Method according to claim 4, characterized in that the pass-points symbolicalily arranged on the terrain image are transformed into a two-dimensional image signal in the second data processing unit (D2), which image signal is correlated with the image generated in the first data processing unit (D1).

6. Method according to claim 4 characterized in that the image generated in the second processing unit (D2) is made visible in a display device (AG), particularly a display or a virtual cockpit.

7. Method according to claim 1, characterized in that the data relevant for data processing and/or image display are transmitted by means of communications networks (K), particularly GSM mobile radio, mobile communications via satellites, or an HV/VHF network.

8. Method according to claim 7, characterized in that the relevant data come from the satellite navigation system (SN), particularly GPS or differential GPS and/or from other communications participants (KT), particularly external reception or evaluation stations and/or other aircrafts.

* * * * *